United States Patent [19]

Powell et al.

[11] 4,224,627
[45] Sep. 23, 1980

[54] SEAL GLASS FOR NOZZLE ASSEMBLIES OF AN INK JET PRINTER

[75] Inventors: Jimmie L. Powell; Rao R. Tummala, both of Wappingers Falls, N.Y.

[73] Assignee: International Business Machines Corporation, Armonk, N.Y.

[21] Appl. No.: 53,147

[22] Filed: Jun. 28, 1979

[51] Int. Cl.² .......................... C03C 3/10; C03C 3/16; C03C 3/08; G01D 15/18
[52] U.S. Cl. ......................................... 346/75; 65/43; 106/14.05; 106/47 R; 106/48; 106/49; 106/50; 106/52; 106/53; 106/54; 346/140 R
[58] Field of Search .......................... 346/140 R, 75; 106/14.05, 50, 47 R, 48, 49, 52, 53, 54; 65/43

[56] References Cited

U.S. PATENT DOCUMENTS 4,122,460  10/1978  Humenik et al. .................. 106/50 X

OTHER PUBLICATIONS

Volf, M. B., *Technical Glasses*, pub. by Pitman & Sons, Ltd., London (1961)–pp. 98–99.

Primary Examiner—Helen M. McCarthy
Attorney, Agent, or Firm—Henry Powers

[57] ABSTRACT

A seal glass for unitizing an array of glass nozzles of an ink jet printer. The seal glasses are corrosion resistant to alkaline and acidic inks, and have low softening points, medium high expansivities and anneal points and are compatible with the nozzle glasses.

11 Claims, 5 Drawing Figures

SEAL GLASS FOR NOZZLE ASSEMBLIES OF AN INK JET PRINTER

DESCRIPTION

1. Technical Field

This invention relates to ink-jet glass nozzle arrays, and more particularly to sealing or solder glass compositions for potting a plurality of nozzle glass tubes into a multi-nozzle assembly for ink-jet printers.

One object of the present invention is to provide a new and improved sealing or solder glass composition adapted for use in the fabrications of ink-jet printing nozzles.

Another object of this invention is to provide a new and improved sealing glass composition for ink-jet nozzles which has increased resistance to corrosive inks employed in ink-jet printing operations.

Another object of this invention is to provide a sealing glass composition resistant to corrosive inks and with thermal properties which are adapted for use in fabrication of glass ink-jet nozzle arrays for use in ink-jet printers.

Another object of this invention is to provide a new and improved sealing glass composition for encasing or potting of a multiple glass nozzle array of an ink-jet printer.

2. Background Art

U.S. Pat. No. 4,019,886, issued Apr. 26, 1977 to Hoffman et al, and U.S. Pat. No. 4,122,460, issued Oct. 24, 1978 to Humenik et al, disclose and claim a multiple ink-jet nozzle array comprehended in this invention of ink-jet printers. Also disclosed in these patents is an extended description of the prior art which is incorporated herein by reference thereto.

In ink-jet printers and/or recorders, liquid ink is supplied under pressure to a nozzle(s) having a very small opening through which an extremely fine, continuous jet of ink is projected as disclosed in the aforesaid patents, ink-jet nozzles made of glass are commonly used in such printers.

Because the inks used in ink-jet printers are usually alkaline (e.g. pH 10.5) or acidic (e.g. 6.25) in nature, the glass comprising the nozzles and associated sealing glasses must be corrosion resistant. Also it has been recognized that the proper operation of such printers depends very much upon the manner in which the nozzle(s) is potted or embedded in a sealing or solder glass with respect to its surrounding surface. The area in the vicinity of the nozzle must be void-free and bubble free to prevent leaking or breaking when the nozzle, in thin wafer form, is subjected to corrosive inks under pressure. Additionally, to prevent excessive stresses and/or cracking of any elements, especially when they are cut into thin wafers and lapped and polished for use in ink-jet printers, the thermal properties and expansion characteristics of the fabricating elements must be carefully considered. Furthermore, the sealing or potting operation must be performed in such a way as not to alter the nozzle size or shape or alignment.

The aforesaid patents describe the fabrication of multiple ink-jet nozzles, in which ceramic or glass blocks are machined to form two plates of a desired smoothness and dimension, preferably in rectangular form. A single groove is formed the length of one side of the first plate, and cross-slots, deeper than the groove, are formed the width of the same side and intersecting the groove. Slots corresponding to the cross-slots are formed the width of one side of the second plate. The groove holds a plurality of glass which may be positioned before or after the two plates are joined. Each slot holds a sealant, such as a glass cane or rod which is inserted between the two plates in the mated slots.

The joined plates with tubes and seal glass cane are then spring-clamped in an upright position on a support, and this entire assembly is then exposed to a temperature which is sufficient to melt only the glass cane, which will then flow by capillary and gravity action, through the groove to provide a complete seal for the tubes, specifically in the area between the cross-slots. After the sealing operation has been completed, the joined plates are gradually cooled and then the area between the slots is sliced into thin nozzle wafers. The presence of the cross slots guarantees uniform fill of the wafer section, reduces the longitudinal distance of seal glass flow and the area of the section cut, and serves as a vent to prevent air entrapment and thus voids, and as a means of introducing coolant as close as possible to the cutting device and wafer nozzles. After one side of the cut wafer undergoes lapping and polishing operations, it is ready for mounting on a back-up plate using techniques such as epoxy bonding, glass sealing or soldering. After mounting, the front side of the wafer is lapped and polished. The wafer thus mounted on the back-up plate is ready for connection to a source of high-pressure fluid.

The aforesaid patent U.S. Pat. No. 4,122,460 discloses that capillary ink-jet nozzles with enhanced thermal coefficients of expansion and anneal points can be obtained by fabrication from a glass composition containing, by weight, from about 40 to about 60% $SiO_2$, from about 12 to about 20% $ZrO_2$, from about 12 to about 17% $Na_2O$, from about 0 to about 2.3% $K_2O$ and from about 0 to about 6% $MgO$.

This basic glass composition was modified for improved resistance against alkaline inks by inclusion of $BaO$, $CaO$, $Li_2O$, $Cu_2O$, $B_2O_3$ and/or $Al_2O_3$ to provide glass compositions containing, by weight, 42 to 52% $SiO_2$, 8 to 17% $ZrO_2$, 6 to 14% $Na_2O$, 0 to 2.3% $K_2O$, 0 to 6% $MgO$, 0 to 5% $B_2O_3$, 4 to 6% $Al_2O_3$, 3 to 22.3% $BaO$, 6.7 to 9.7% $CaO$, 0 to 2% $Li_2O$ and 0 to 7% $Cu_2O$.

Also the basic glass composition can be modified for improved resistance to acidic inks by inclusion of $As_2O_3$, $CaO$ and $Al_2O_3$ to form a glass composition comprising, by weight, 35 to 58.5% $SiO_2$, 17 to 22.5% $ZrO_2$, 16 to 17% $Na_2O$, 2 to 3% $K_2O$, 3 to 5% $MgO$, 0 to 1% $Al_2O_3$, 0 to 2.5% $CaO$ and 0.5% $As_2O_3$.

The glass for sealing or unitizing the glass nozzles in an assembly must have an expansion near that of the nozzle glass at the set point of the seal glass and must also flow at a temperature near or below that of the anneal temperature (Ta) of the nozzle glass composition. If, during sealing, the Ta of the nozzle glass is significantly exceeded, the nozzles will deform and be useless.

In general, a glass for use as a sealant or encapsulant for ink-jet printing nozzles must satisfy three basic criteria. First, the glass must be chemically durable toward slightly acidic or very alkaline inks used in ink-jet printing. Second, the glass must possess thermal properties which will enable it to seal or encapsulate glass nozzles into the required assembly. For example, the seal glasses used for making seals must be ones having a softening temperature well below the deformation temperature of any surface to which it is applied so that the seal glass can flow and wet the surface at a temperature below that at which such surfaces become deformed. Also such glasses must conform to the well known rules of matching the thermal coefficients (e.g. expansion) in order to prevent or minimize the occurrence of thermal stresses on cooling.

It is generally accepted that, as a general rule, the thermal coefficient of expansion of a sealing glass increases as the sealing or softening temperature (Ts) of that glass decreases. Consequently, most soft glasses which can flow at relatively low temperature (e.g. 400° C. have coefficients in excess of $94 \times 10^{-7}$/°C. Such expansion coefficients are too high to permit satisfactory sealing of glass nozzles currently contemplated for ink-jet printers. In general, it is desirable for the seal glasses to have an expansion coefficient ($\alpha$ at 24°–300° C.) of 54.6 to $88.6 \times 10^{-7}$/°C., an anneal temperature (Ta) of 415° to 503° C. and a softening temperature (Ts) of 484° to 622° C. Optimally the seal glasses should have the following thermal properties: $\alpha$ of $78 \pm 3 \times 10^{-7}$/°C., Ta of $450 \pm 30°$ C. and a Ts of $550 \pm 30°$ C.

Lastly, the seal glass must be vitreous in nature so it can be easily fabricated into fibers, rods or cane form.

BRIEF DESCRIPTION OF THE DRAWINGS

In the accompanying drawings forming a material part of this disclosure.

DISCLOSURE OF INVENTION

Figure 1:
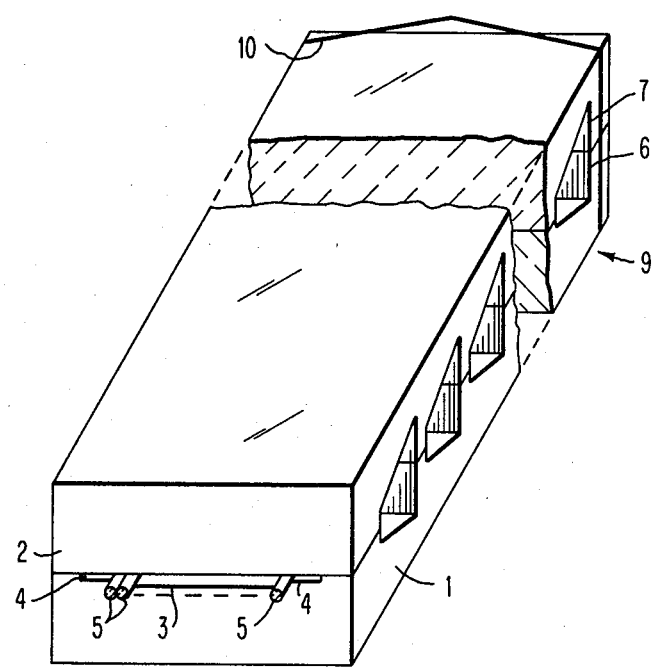
FIG. 1 shows a plate configuration employed in fabrication of a multiple ink-jet array for illustration of this invention.

It has been found that high-lead borate seal glasses that are commercially available for fabrication of glass nozzle arrays, for ink-jet printers, have very low corrosion resistance toward alkaline and acidic ink solutions employed for high speed printing applications, particularly with use with the glass nozzle compositions described in the aforesaid patent U.S. Pat. No. 4,122,460. These commercial seal glasses have been found to disintegrate in both types of ink solutions when exposed to them for a relatively short period of time (e.g. 24 hours at 60° C.).

Passivation of the reflowed surfaces of the commercial seal glasses with thin film coating materials such as $TiO_2$, $SiO_2$, $ZrO_2$ and Au has been found to provide insufficient protection, for the seal glass, from corrosive inks, primarily because the materials cannot be deposited completely pin-hole free. The ink seeps into the pin-holes and disintegrates the glass. This, then results in the particulate matter, from the chemically unstable glass, contaminating the continually circulating inks, of the printer, when they enter and exit the orifices of the ink-jet nozzles (e.g. the reflowed seal glass is exposed at these locations). The level of contamination continues to increase as the erosion of the glass, by the inks, progresses. Eventually, the nozzles, in the jet array, clog up with residual seal glass matter and cease to function properly. In light of this serious problem, the high-lead borate glasses are considered to be unreliable as a seal for multi-glass nozzle arrays, in terms of long-term performance.

This invention discloses seal glass compositions that possess high chemical durability and relatively low softening temperatures, anneal temperatures and matching expansion coefficients for ink-jet nozzle arrays. These seal glasses are not only unique in their high chemical corrosion resistance, but they also have thermal properties suitable for sealing or encasing glass nozzles into stable arrays. The chemical compositions of the seal glasses fall into two categories, alkali-resistant and acid resistant, as discussed below.

Alkali-Resistant Seal Glasses

Vitreous lead borate seal glasses with moderately low thermal properties (Ts, Ta and $\alpha$) are not difficult to formulate, but it is very difficult, if not impossible, to impart good corrosion resistance to the composition of such glasses without significantly increasing their thermal reflow properties.

In Table I, below, a typical lead borate glass, C-223, is compared with some developmental chemically durable seal glasses in terms of thermal properties, chemical composition and chemical resistance in an alkaline electrostatic ink-solution of pH 10.5. All glasses were exposed to the ink for at least 24 hours and the degree of corrosion was accelerated during the test by increasing the ink temperature from 25° to 60° C. By using small rods of the glass, the surface area exposed to the ink was greatly increased. These rods were characterized with a diameter of 0.042 inches. A 24 hour test of this nature was found to be equivalent to a 300 hour test on an equal amount of glass tested as a single mass.

TABLE I

| | Thermal properties, compositions and alkaline resistance of a typical lead borate glass C-223 and developmental glasses | | | | | | | | | | | |
|---|---|---|---|---|---|---|---|---|---|---|---|---|
| Oxide, wt% | C-223 | S-231 | S-269 | S-260 | S-283 | S-271 | S-315 | S-318 | S-345 | S-409 | S-412 | S-418 |
| PbO | 58.0 | 56.0 | | | | 45.0 | 45.0 | 45.0 | 45.0 | 50.0 | 51.0 | 53.5 |
| $SiO_2$ | 10.0 | 8.0 | 8.0 | 10.0 | 10.0 | 24.5 | 24.5 | 24.5 | 24.5 | 18.0 | 18.0 | 15.0 |
| $B_2O_3$ | 19.5 | 19.0 | 6.9 | 17.0 | 15.0 | 7.5 | 5.0 | 5.0 | 5.0 | 10.0 | 11.0 | 12.0 |
| $ZrO_2$ | | 3.5 | | | | 4.5 | 4.5 | 4.5 | 4.5 | 4.5 | 4.5 | 4.5 |
| ZnO | 4.0 | 4.0 | 9.0 | 4.0 | | 3.5 | 4.5 | 3.5 | 4.0 | 3.5 | 3.5 | 3.5 |
| $Na_2O$ | | 1.0 | 5.0 | 4.0 | | 5.0 | 5.0 | 6.5 | 5.0 | 3.5 | 2.5 | 1.0 |
| BaO | | | | | | | 1.5 | 1.0 | 1.5 | 1.0 | 1.0 | 1.0 |
| CaO | | 2.0 | 1.5 | | | 1.5 | 1.0 | 1.0 | 0.5 | 0.5 | 0.5 | 0.5 |
| MgO | 2.5 | 2.5 | 2.0 | 2.5 | | 1.5 | 1.0 | 1.0 | 1.0 | 0.5 | 0.5 | 0.5 |
| $Al_2O_3$ | 4.0 | 4.0 | 8.0 | 4.0 | 5.0 | 4.0 | 4.0 | 4.0 | 4.0 | 4.0 | 3.0 | 4.0 |
| CdO | | | 60.0 | 56.6 | 67.0 | 3.0 | 2.5 | 2.0 | 2.5 | 2.0 | 2.0 | 2.0 |
| $TiO_2$ | | | | | | | 2.0 | 2.0 | 2.0 | 0.25 | 0.25 | 0.25 |
| CuO | 2.0 | | | | | | | | | | | |
| $GeO_2$ | | | | 2.0 | 3.0 | | | | | | | |

TABLE I-continued

Thermal properties, compositions and alkaline resistance of a typical lead borate glass C-223 and developmental glasses

| Oxide, wt% | C-223 | S-231 | S-269 | S-260 | S-283 | S-271 | S-315 | S-318 | S-345 | S-409 | S-412 | S-418 |
|---|---|---|---|---|---|---|---|---|---|---|---|---|
| $La_2O_3$ | | | | | | | | | 0.5 | 0.25 | 0.25 | 0.25 |
| $Cu_2O$ | | | | | | | | | | 2.0 | 2.0 | 2.0 |
| $\alpha \times 10^{-7}/°C$ (24–300° C.) | 69.0 | 75.0 | 78.5 | 86.1 | 75.4 | 80.0 | 71.3 | 88.6 | 81.3 | 80.7 | 76.0 | 69.5 |
| Ts, °C. | 522 | 531 | 622 | 560 | 605 | 572 | 588 | 570 | 594 | 529 | 533 | 532 |
| Ta, °C. | 434 | 445 | 483 | 471 | 522 | 454 | 462 | 448 | 468 | 418 | 422 | 431 |
| Wt. Loss $(mg/cm^2)$* in alkaline ink, pH = 10.5 | 10.28 | 4.04 | 4.91 | 2.69 | 2.55 | 0.412 | 0.212 | 0.223 | 0.144 | 0.404 | 0.837 | 0.573 |

*24 hour accelerated test at 60° C.

Although, it can be seen that the thermal properties of the chemically durable "S" glasses are slightly greater in value than those of the C-223 glass, results show that most of these glasses are quite compatible with the nozzle glasses (particularly A-192*) of the aforesaid patent U.S. Pat. No. 4,122,460, in terms of thermal properties, e.g. they can be reflowed sufficiently in the temperature range of 700°–750° C. This suitable reflowability is attributed to the inclusion of PbO, $Na_2O$ and/or CdO in the seal glass composition. The oxides are known for their ability to decrease the viscosity of glasses.

The data in Table I also shows the chemical durability of the various glasses with respect to an alkaline ink solution. The weight losses of the seal glasses are much less than that of the C-223 glass in an alkaline ink of pH 10.5. For example, the S-345 seal glass exhibits a weight loss that

| *Composition A-192, wt. % | | | |
|---|---|---|---|
| $SiO_2$ | 58.5 | MgO | 4.0 |
| $ZrO_2$ | 19.0 | $K_2O$ | 2.0 |
| $Na_2O$ | 16.0 | $As_2O_3$ | 0.5 |
| Ts °C. | 863 | Ta °C. | 673 |

Loss $(mg/cm^2)$ 0.0053 $\alpha$ = 88.1 × $10^{-7}/°$ C (24–300° C)  Accelerated test - 24 hours at 60° C, in acidic ink pH 6.25, see FIG. 9, 4,122,260 for Alkali resistance.

is 71 times less than the weight loss of the C-223 glass. However, the S-315 glass is a more preferred glass for sealing A-192 glass nozzles into an array, since it has thermal properties that are more compatible with the nozzle glass, even though its weight loss is 48 times less than the C-223 glass, and only 15 times more than nozzle glass A-192 in a pH 10.5 alkaline ink.

It is noted, that samples of the C-223 and S-231 glasses almost completely disintegrated in both the alkaline and acidic ink solutions (pH 10.5 and 6.25) when tested for 24 hours at 60° C. The other glasses listed in Table I only disintegrated in the acidic ink to any noticeable degree, and this can be considered poor acid-resistant glasses.

Glasses of the S-315 and S-283 types have several features that make them the best available glasses for sealing or encasing glass nozzles into arrays for use in ink-jet devices that require an alkaline ink-solution for printing.

These features include alkali-resistance of seal glasses such as the lead silicate S-315 and the cadmium borate S-283 type, which is better than any seal glass known at this time.

Also seal glasses S-315 and S-283 can readily be drawn into fibers, rods or cane free of crystal with a capability to be reflowed around glass nozzles without chemical reaction occurring at the surface's interfaces.

Also, such glasses have thermal properties that are relatively compatible with those of the nozzle glasses, such as A-192.

Moreover, a glass such as the S-315 type (that is basically a lead silicate with significant additions of $ZrO_2$, $B_2O$, CaO, MgO, $Al_2O_3$, and $TiO_2$ and CdO to further impart alkali-resistance) offers a better solution to the fabrication of highly alkali-resistant ink-jet nozzle arrays than any seal glass/nozzle glass composite known to date.

Acid-Resistant Seal Glasses

It has been determined that seal glasses which have good corrosion resistance toward alkaline ink solutions do not necessarily have similar corrosion resistance against an acidic ink solution; and because of this determination, several glasses have been developed which have significantly improved resistance against the corrosive attack of acidic ink solutions (e.g. pH 6.25).

In Table II, the composition, thermal properties and ink resistances of the new glasses are compared with those of the C-223 glass. The table shows that most of the glasses have softening temperatures, anneal temperatures and expansion coefficients slightly greater than the C-223 glass. However, this has not been found to be a problem in making seal glass/nozzle glass composite. In practice, reflow experiments have indicated that the viscosity of the new glasses, at 700° C., is as good or better than that of the lead borate glass C-223. This low viscosity is attributed directly to the high $P_2O_5$ content in the composition of the glasses.

TABLE II

Thermal properties, compositions and ink resistance of the new "S" glasses and C-223 glass.

| Oxide, wt% | C-223 | S-347 | S-319 | S-289 | S-290 |
|---|---|---|---|---|---|
| $P_2O_5$ | — | 69.5 | 69.5 | 70.0 | 15.3 |
| PbO | 58.0 | — | — | — | — |
| $SiO_2$ | 10.0 | 2.5 | 4.0 | 5.0 | — |
| $B_2O_3$ | 19.5 | — | — | — | 18.3 |
| $ZrO_2$ | — | 2.0 | 0.5 | — | — |
| ZnO | 4.0 | 14.0 | 14.0 | 14.0 | 66.4 |
| $Na_2O$ | — | 4.0 | 4.0 | 3.0 | — |
| $Al_2O_3$ | 4.0 | 7.0 | 7.5 | 8.0 | — |
| $TiO_2$ | — | 1.0 | 0.5 | — | — |
| MgO | 2.5 | — | — | — | — |
| CuO | 2.0 | — | — | — | — |
| $\alpha \times 10^{-7}/°C$ (24°–300° C.) | 69.0 | 74.9 | 83.0 | 77.8 | 54.6 |
| Ts (°C.) | 522 | 578 | 563 | 572 | 580 |
| Ta (°C.) | 434 | 457 | 439 | 448 | 503 |
| Wt. Loss $(mg/cm^2)$* in pH 6.25 acidic ink | 15.2 | 0.185 | 0.279 | 0.414 | 2.24 |

*24 hour accelerated test at 60° C.

As will be noted Table II also gives the chemical durability of the various glasses with respect to a slightly acidic electrostatic ink (pH=6.25). All of the developmental seal glasses exhibit weight losses that are much less than that of the C-223 glass. The seal glass, with the designation S-347, has been found to be the best glass for making structurally sound highly acid-resistant nozzle arrays, because this glass is thermally compatible with the nozzle glass A-192, in terms of expansion coefficient and because it exhibits a very high corrosion resistance towards the acidic ink solutions. The S-347 type of glass has, in combination, the lowest Ts and $\alpha$, and the highest Ta and acidic corrosion resistance of any seal glass known to date. The weight loss of the S-347 glass, in the acidic ink, is 82 times less than that of the C-223 glass, and only 30 times more than the A-192 nozzle glass.

When the seal glasses, in Table II, were exposed to the alkaline (pH=10.5) ink solution for 24 hours at 60° C., they showed signs of severe corrosion; and thus they are not adapted for use in alkali inks.

A glass, such as the S-347 type (that is essentially a $P_2O_5$ zinc oxide containing glass with small amounts of $ZrO_2$, $Al_2O_3$, $TiO_2$, $SiO_2$ and/or $Na_2O$ to substantially improve acid resistance) provides a better solution to the fabrication of a good acid-resistant ink-jet glass nozzle arrays than any seal glass known at the present time.

In summary, U.S. Pat. No. 4,122,460 has disclosed excellent corrosion resistant glasses (e.g. A-192, see Table III and FIG. 9 of this patent) which are complemented by the seal glasses of this invention, which are compatible with each other to form an ink-jet nozzle assembly. These seal glasses, in addition to having appropriate thermal properties to be able to be reflowed about the nozzle glass and result in low stress ink-jet nozzle package, also possess chemical resistance about 75 times better than presently available high-lead borate glass.

Best Mode for Carrying Out The Invention

As shown in FIG. 1, a plate assembly is illustrated for the fabrication of multiple nozzle arrays. Plates 1 and 2, preferably of the same material (e.g. A-192 glass) or ceramic, and surface area, are machined to provide parallel, deep, trapezoidal-type slots 6 and 7 along one surface thereof. Plate 1 is further machined to provide a single wide groove 3 and smaller grooves 4. Groove 3 must be wide enough to permit a plurality of capillary glass orifice elements or tubes 5, of this invention, to be placed snugly side by side across the entire length of the groove surface. Groove 3 may also be slightly tapered in the corners or have undercuts in the inside corners. Smaller grooves 4 may take any dimension to assure a flow of a first sealing glass between the plates to guarantee a bond between plates 1 and 2. Groove 8 provides for alignment of the plates when assembled.

FIG. 1 shows plates 1 and 2 joined to form a plate assembly 9. It will be noted that slots 6 and 7 are perfectly aligned by wire 10 in groove 8. The wire is made of heat resistant material, e.g., tungsten. Such alignment is necessary since the area between each adjacent pair of slots will later be cut to form the multiple nozzle wafers. At this time, the plates are joined, but not sealed, and the capillary glass tubes 5 (e.g. A-192 glass) are shown resting loosely in groove 3.

Figure 2:
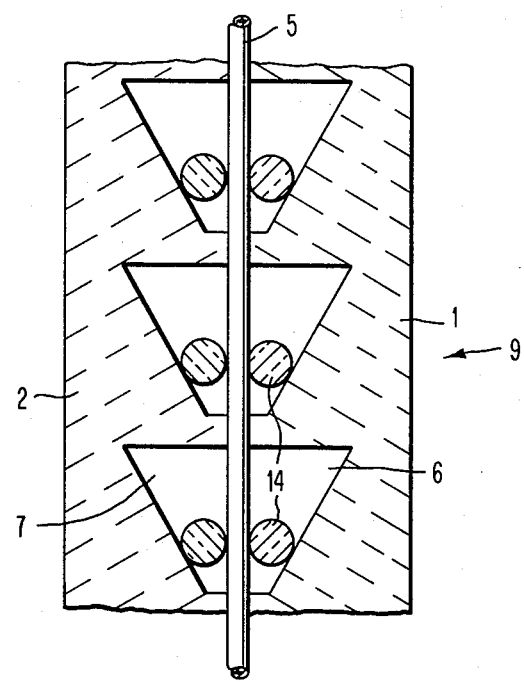
FIG. 2 is a sectional view taken along line 2—2 of FIG. 1.

FIG. 2 shows a plate assembly 9 held upright to permit downward melt flow of a first glass seal or cane glass 14 (e.g. S-315 for alkali ink application or S-347 for acidic ink application) when the assembly and support are placed in a furnace and heated. The glass tubes are shown extended beyond the lower portion of the assembly to prevent possible orifice blockage caused by melt flow up the tubes due to capillary action.

FIG. 2 also is shown as a partial cross-sectional view, taken along lines 2—2 of assembly 9 of FIG. 1. It will be seen that the trapezoidal-type slots on both sides of glass tube 5 permit the glass seal or cane glass 14 to rest snugly against the glass tube on both sides and, therefore, when melted (e.g. at about 700°–750° C.), to flow freely, due to capillary and gravity action, to cause the glass area between each upper slot and lower slot to seal in a void and bubble free manner.

Figure 3:
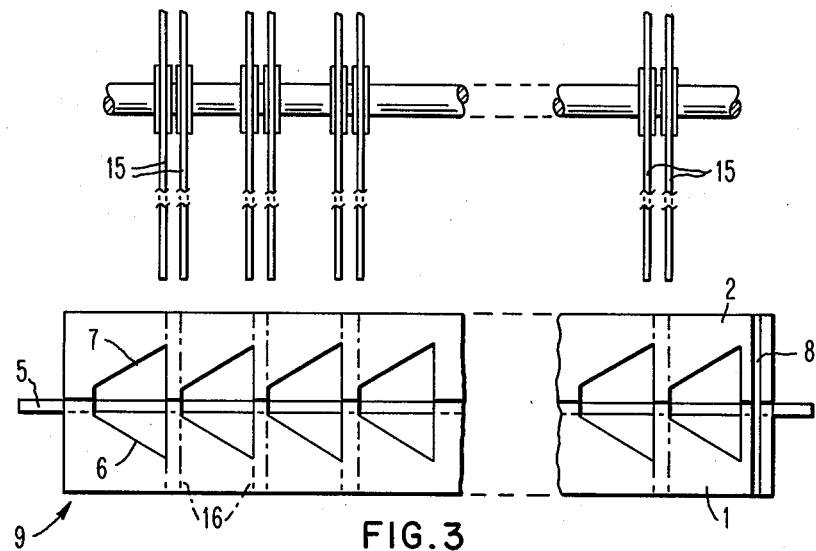
FIG. 3 illustrates another stage in the fabrication of a plurality of wafers containing a multiple ink-jet nozzle array.

FIG. 3 illustrates one way in which plate assembly 9 may be cut after the sealing operation, wherein a plurality of uniformly spaced sawing elements 15 are moved relative to the plate assembly 9. The assembly, mounted on a fixture of a gang sawing machine, is fed parallel with the plane of the saws while cutting takes place. While rotary saws are shown, reciprocating blade saws can also be used. It should be understood that wafers can also be cut singly in accordance with accepted techniques, although simultaneous cutting of the wafers 16 with a gangsaw arrangement is preferred, since it produces more uniform thickness throughout the length of the wafer. In the disclosed arrangement which forms a part of the invention, the cross slots 6 and 7 reduce the area of the section cut and serve as a means for introducing an appropriate coolant as close as possible to the saw blades and the glass tubes. This assures a cutting operation without tube or seal glass damage.

Figure 4:
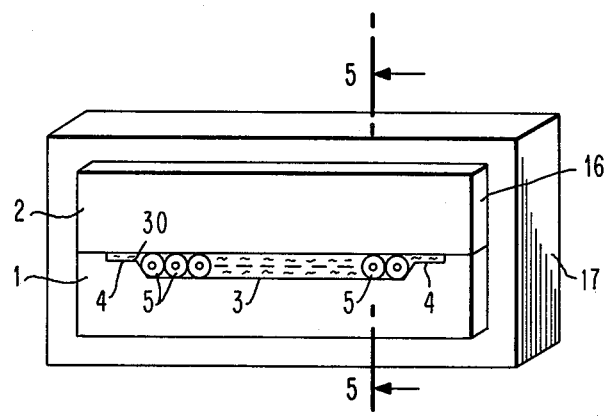
FIG. 4 illustrates a wafer containing a multiple ink-jet nozzle array mounted on a back-up plate for an ink-jet printer.
Figure 5:
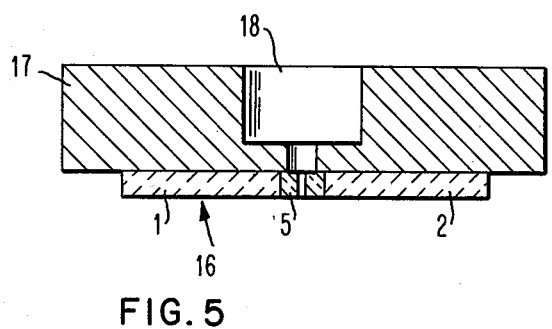
FIG. 5 is a cross-sectional view taken along line 5—5 of FIG. 4.

FIG. 4 shows a typical wafer 16 with the formed glass melt or seal 30 in grooves 3 and 4 which fully seals the tubes and provides a bond between the plates. After a wafer is cut, there are performed precision lapping and polishing operations that are known, e.g. see the IBM Technical Disclosure Bulletin, December 1974, Vol. 17, No. 7, p. 2171. After one side of the wafer 16 has been suitably lapped and polished, it is mounted, as shown in FIG. 5, on back-up plate 17 to form the head of an ink jet recording apparatus. The back-up plate should preferably be the same material, i.e. ceramic or glass, as the wafer, although this is not mandatory. As for the mounting operations, this may be done by applying a thin coating of glass solder or epoxy at least on that portion of the back-up plate coextensive with the dimensions of the wafer and entirely around the passageway opening. With the wafer properly aligned on the plate, it is heated, thereby causing the solder glass or epoxy to be molten and, when cooled, to bond the wafer to the back-up plate. After mounting, the front side of the wafer is lapped and polished.

FIG. 5 illustrates a partial cross-sectional view of the mounted wafer 16, taken along lines 5—5 of FIG. 4, with proper alignment of the glass tube 5 and opening 18 of back-up plate 17. The opening in the back-up plate adjacent the wafer is larger than the glass tube opening but smaller than the annular diameter of the tube so that a fluid-tight seal is obtained to assure that when pressurized fluid is supplied to the plate, leakage will not occur around the tube.

While the invention has been illustrated and described with respect to preferred embodiments thereof, it is to be understood that the invention is not to be limited to the precise construction herein disclosed and the right is reserved to all changes and modifications coming within the scope of the invention as defined in the appended claims.

Having thus described the invention, what is claimed as new, and desired to be secured by Letters Patent is:

1. In a multiple ink-jet glass nozzle array embedded in a seal glass mass with the nozzle elements of said array fabricated from a composition consisting essentially, by weight, of

| $SiO_2$ | 55–58.5% | $Al_2O_3$ | 0–1.0% |
|---|---|---|---|
| $ZrO_2$ | 17.0–22.5% | CaO | 0–2.5% |
| $Na_2O$ | 16.0–17.0% | $K_2O$ | 2.0–3.0% |
| MgO | 3.0–5.0% | $As_2O_3$ | 0.5%, | the improvement comprising forming said seal glass mass from a vitrified frit having a composition, by weight percent, selected from the group of:

A. a first alkaline resistant formulation of

| PbO | [0–56] 45.0–53.5% | [$GeO_2$ | 0–3%] |
|---|---|---|---|
| $SiO_2$ | [8–25] 15.0–24.5% | $ZrO_2$ | [0.5–6.0] 4.5% |
| $B_2O_3$ | 5–[19] 12% | MgO | [1–2.5] 0.5–1.5% |
| ZnO | 3.5–[9] 4.5% | BaO | 0–1.5% |
| $Al_2O_3$ | [4–8] 3.0–4.0% | $TiO_2$ | [0–2] 0.5–1.5% |
| $Na_2O$ | 1–6.5% | CaO | [0–2] 0.5–1.5% |
| CdO | [0–67] 2–3% | $La_2O_3$ | 0–0.5% |
| $Cu_2O$ | [1–3] 0–2%; | | | said formulation having an expansion coefficient ($\alpha$ at 24°–300° C.) of from about 69.5 to $88.6 \times 10^{-7}$/° C., an anneal temperature ($T_a$) of about 418° to 468° C. and a softening temperature ($T_s$) of about 529° to 594° C.;

B. a second alkaline resistant formulation of

| CdO | 56.6–67.0% | MgO | 0–2.5% |
|---|---|---|---|
| $SiO_2$ | 8–10% | $Al_2O_3$ | 4.0–8.0% |
| $B_2O_3$ | 6.9–17.0% | $GeO_2$ | 0–3.0% |
| ZnO | 0–9.0% | | |
| $Na_2O$ | 0–5.0% | | |
| CaO | 0–1.5%; and | | | said formulation having an expansion coefficient ($\alpha$ at 24°–300° C.) of from about 75 to $86.1 \times 10^{-7}$/° C., an anneal temperature ($T_a$) of about 471° to 522° C. and a softening temperature ($T_s$) of about 560° to 622° C.; and C. an acid resistant formulation of

| $P_2O_5$ | 15–70.0% | $Na_2O$ | 0–4.0% |
|---|---|---|---|
| ZnO | 14.0–66.4% | $SiO_2$ | 0–5.0% |
| $B_2O_3$ | 0–18.3% | $ZrO_2$ | 0–2% |
| $Al_2O_3$ | 7–8% | $TiO_2$ | 0–1% | said formulation having an expansion coefficient ($\alpha$ 24°–300° C.) of from about 54.6 to $83.0 \times 10^{-7}$/° C., an anneal temperature ($T_a$) of about 439° to 503° C., and a softening temperature ($T_s$) of about 563° to 580° C.

2. In a glass nozzle array for an ink-jet printer, comprising:

a plurality of glass tubes coextending in parallel relationship with each other with the nozzle elements of said array fabricated from a composition consisting essentially by weight, of

| $SiO_2$ | 55–58.5% | $Al_2O_3$ | 0–1.0% |
|---|---|---|---|
| $ZrO_2$ | 17.0–22.5% | CaO | 0–2.5% |
| $Na_2O$ | 16.0–17.0% | $K_2O$ | 2.0–3.0% |
| MgO | 3.0–5.0% | $As_2O_3$ | 0.5%, | and a seal glass for unitizing said tubes in a matrix therein, the improvement wherein said seal glass has a composition, by weight percent, selected from the group consisting of:

A. an alkaline resistant formulation of

| PbO | [0–56] 45.0–53.5% | $GeO_2$ | [0–3%] |
|---|---|---|---|
| $SiO_2$ | [8–25] 15–24.5% | $ZrO_2$ | [0.5–6.0] 4.5% |
| $B_2O_3$ | 5–[19] 12% | MgO | [1–2.5] 0.5–1.5% |
| ZnO | 3.5–[9] 4.5% | BaO | 0–1.5% |
| $Al_2O_3$ | [4–8] 3–4% | $TiO_2$ | [0–2] 0.5–1.5% |
| $Na_2O$ | 1–6.5% | CaO | [0–2] 0.5–1.5% |
| CdO | [0–67] 2–3% | $La_2O_3$ | 0–0.5% |
| $Cu_2O$ | [1–3] 0–2%; [and] | | | said formulation having an expansion coefficient ($\alpha$ at 24°–300° C.) of from about 69.5 to $88.6 \times 10^{-7}$/° C., an anneal temperature ($T_a$) of about 418° to 468° C. and a softening temperature ($T_s$) of about 529° to 594° C.;

B. a second alkaline resistant formulation of

| CdO | 56.6–67.0% | Mgo | 0–2.5% |
|---|---|---|---|
| SiO hd 2 | 8–10% | $Al_2O_3$ | 4.0–8.0% |
| $B_2O_3$ | 6.9–17.0% | $GeO_2$ | 0–3.0% |
| ZnO | 0–9.0% | | |
| $Na_2O$ | 0–5.0% | | |
| CaO | 0–1.5%; | | | said formulation having an expansion coefficient ($\alpha$ at 24°–300° C.) of from about 75 to $86.1 \times 10^{-7}$/° C., an anneal temperature ($T_a$) of about 471° to 522° C. and a softening temperature ($T_s$) of about 560° to 622° C.; and C. an acid resistant formulation of

| $P_2O_5$ | 15–70.0% | $Na_2O$ | 0–4.0% |
|---|---|---|---|
| ZnO | 14.0–66.4% | $SiO_2$ | 0–5.0% |
| $B_2O_3$ | 0–18.3% | $ZrO_2$ | 0–2% |
| $Al_2O_3$ | 7–8% | $TiO_2$ | 0–1% | said formulation having an expansion coefficient ($\alpha$ 24°–300° C.) of from about 54.6 to $83.0 \times 10^{-7}$/° C., an anneal temperature ($T_a$) of about 439° to 503° C., and a softening temperature ($T_s$) of about 563° to 580° C.

3. A glass nozzle array of claim 2 resistant to alkaline inks wherein said seal glass consists essentially of, by weight,

| PbO | [0–56]45–53.5% | [$GeO_2$ | [0–3%] |
|---|---|---|---|
| $SiO_2$ | [8–25]15–24.5% | $ZrO_2$ | [0.5–6.0]4.5% |
| $B_2O_3$ | 5–[19]12% | MgO | [1–2.5]0.5–1.5% |
| ZnO | 3.5–[9]4.5% | [$B_2O_3$] | BaO 0–1.5% |
| $Al_2O_3$ | [4–8]3–4% | $TiO_2$ | [0–2]0.5–1.5% |
| $Na_2O$ | [1–6.5]2–3% | CaO | [0–2]0.5–1.5% |
| CdO | [0–67]0–2% | $La_2O_3$ | 0–0.5% |

4. The glass nozzle array of claim 3 wherein said glass nozzles consist essentially of, by weight,

| SiO$_2$ | 58.5% | MgO | 4.0% |
|---|---|---|---|
| ZrO$_2$ | 19.0% | K$_2$O | 2.0% |
| Na$_2$O | 16.0% | As$_2$O$_3$ | 0.5%, |

5. The glass nozzle array of claim 4 wherein said seal glass consists essentially of, by weight,

| PbO | 45% | BaO | 1.5% |
|---|---|---|---|
| SiO$_2$ | 24.5% | CaO | 1% |
| B$_2$O$_3$ | 5% | MgO | 1% |
| ZrO$_2$ | 4.5% | Al$_2$O$_3$ | 4% |
| ZnO | 4.5% | CdO | 2.5% |
| Na$_2$O | 5% | TiO$_2$ | 2% |

6. A glass nozzle array of claim 2 resistant to alkaline inks wherein said seal glass consists essentially of, by weight,

| CdO | 56.6–67% | CaO | 0–1.5% |
|---|---|---|---|
| SiO$_2$ | 8–10% | MgO | 0–2.5% |
| B$_2$O$_3$ | 6.9–17% | Al$_2$O$_3$ | 4–8% |
| ZnO | 0–9.0% | GeO$_2$ | 0–3% |
| Na$_2$O | 0–5% | | |

7. The glass nozzle array of claim 6 wherein said glass nozzle consists essentially of, by weight,

| SiO$_2$ | 58.5% | MgO | 4% |
|---|---|---|---|
| ZrO$_2$ | 19% | K$_2$O | 2% |
| Na$_2$O | 16.0% | As$_2$O$_3$ | 0.5% |

8. The glass nozzle array of claim 7 wherein said seal glass consists essentially of, by weight,
 SiO$_2$: 10%
 B$_2$O$_3$: 15%
 Al$_2$O$_3$: 5%
 CdO: 67%
 GeO$_2$: 3%.

9. A glass nozzle array of claim 2 resistant to acidic inks wherein said seal glass consists essentially of, by weight;

| P$_2$O$_5$ | 15–70% | Na$_2$O | 0–4% |
|---|---|---|---|
| ZnO | 14–66.4% | SiO$_2$ | 0–5% |
| B$_2$O$_3$ | 0–18.3% | ZrO$_2$ | 0–2% |
| Al$_2$O$_3$ | 7–8% | TiO$_2$ | 0–1% |

10. The glass nozzle array of claim 9 wherein said glass nozzles consist essentially of, by weight,

| SiO$_2$ | 58.5% | MgO | 4% |
|---|---|---|---|
| ZrO$_2$ | 19% | K$_2$O | 2% |
| Na$_2$O | 15% | As$_2$O$_3$ | 0.5% |

11. The glass nozzle array of claim 10 wherein said seal glass consists essentially of, by weight;

| P$_2$O$_5$ | 69.5% | Na$_2$O | 4% |
|---|---|---|---|
| SiO$_2$ | 2.5% | Al$_2$O$_3$ | 7% |
| ZrO$_2$ | 2% | TiO$_2$ | 1% |
| ZnO | 14% | | |

* * * * *